(12) United States Patent
Crawford et al.

(10) Patent No.: US 11,407,947 B2
(45) Date of Patent: Aug. 9, 2022

(54) SYSTEMS AND METHODS FOR RECYCLING WASTE PLASTICS

(71) Applicant: Agilyx Corporation, Tigard, OR (US)

(72) Inventors: Sean Crawford, Tigard, OR (US); Barry Cavinaw, Wilsonville, OR (US)

( * ) Notice: Subject to any disclaimer, the term of this patent is extended or adjusted under 35 U.S.C. 154(b) by 0 days.

(21) Appl. No.: 17/544,613

(22) Filed: Dec. 7, 2021

(65) Prior Publication Data
US 2022/0186121 A1 Jun. 16, 2022

Related U.S. Application Data

(60) Provisional application No. 63/123,965, filed on Dec. 10, 2020.

(51) Int. Cl.
*C10B 57/06* (2006.01)
*C10G 1/02* (2006.01)
(Continued)

(52) U.S. Cl.
CPC .............. *C10B 57/06* (2013.01); *B01J 6/008* (2013.01); *C10B 53/07* (2013.01); *C10B 57/02* (2013.01);
(Continued)

(58) Field of Classification Search
CPC .................................. C10B 57/06; C10G 1/02
(Continued)

(56) References Cited

U.S. PATENT DOCUMENTS 1,553,141 A 9/1925 Clark
2,359,212 A 9/1944 Frank et al.
(Continued)

FOREIGN PATENT DOCUMENTS

EP 0 554 761 A1 1/1993
EP 0 682 590 B1 8/1998
(Continued)

OTHER PUBLICATIONS

Heynderickx et al., "A Shell-and-Tube Pyrolysis Reactor for Olefin Production," Ind. Eng. Chem. Res. 1992, vol. 31, 2080-2087.

*Primary Examiner* — Nina Bhat
(74) *Attorney, Agent, or Firm* — Seed IP Law Group LLP

(57) ABSTRACT

Systems and methods for processing waste plastics are provided. One method includes mixing, heating and compacting a supply of the waste plastic based feedstock having an appreciable amount of halide compounds or heteroatoms from one or more sources of contamination; providing an amendment comprising alkaline earth oxides and/or hydroxides, oxides of iron, and/or oxides of aluminum to be mixed, heated and compacted with the waste plastic based feedstock to form a densified melt of plastic material including the amendment; and pyrolyzing the densified melt of plastic material including the amendment within a pyrolysis reactor. Another method includes pyrolyzing a supply of the waste plastic feedstock within a pyrolysis reactor to generate a hydrocarbon gas stream and a solids residue stream; condensing out a tars product from the hydrocarbon gas stream output from the pyrolysis reactor with a quenching apparatus; and pyrolyzing the tars product within a supplemental pyrolysis reactor.

27 Claims, 2 Drawing Sheets

(51) Int. Cl.
- *B01J 6/00* (2006.01)
- *C10B 53/07* (2006.01)
- *C10B 57/02* (2006.01)
- *C10B 57/08* (2006.01)

(52) U.S. Cl.
CPC ............ *C10B 57/08* (2013.01); *C10G 1/02* (2013.01); *C10G 2300/1003* (2013.01); *C10G 2300/202* (2013.01); *C10G 2300/80* (2013.01)

(58) Field of Classification Search
USPC ..... 585/241; 201/2.5, 25; 202/105, 209, 113
See application file for complete search history.

(56) References Cited

U.S. PATENT DOCUMENTS

| | | | |
|---|---|---|---|
| 2,395,829 | A | 3/1946 | King |
| 3,078,530 | A | 2/1963 | Riccardi et al. |
| 3,419,588 | A | 12/1968 | de Man |
| 3,763,015 | A | 10/1973 | Morimoto et al. |
| 3,810,563 | A | 5/1974 | La Mers |
| 3,901,951 | A | 8/1975 | Nishizaki |
| 4,164,484 | A | 8/1979 | Tokuda et al. |
| 4,168,942 | A | 9/1979 | Firth |
| 4,208,252 | A * | 6/1980 | Yoshida .......... C10B 53/07 48/89 |
| 4,220,480 | A | 9/1980 | Dwan |
| 4,310,049 | A | 1/1982 | Kalvinskas et al. |
| 4,317,800 | A | 3/1982 | Sloterdijk et al. |
| 4,324,643 | A | 4/1982 | Durai-Swamy |
| 4,454,084 | A | 6/1984 | Smith et al. |
| 4,584,421 | A * | 4/1986 | Saito .......... C10G 1/10 201/2.5 |
| 5,012,034 | A | 4/1991 | Weingaertner et al. |
| 5,072,068 | A | 12/1991 | Luo et al. |
| 5,136,117 | A | 8/1992 | Paisley et al. |
| 5,240,656 | A | 8/1993 | Scheeres |
| 5,269,947 | A | 12/1993 | Baskis |
| 5,300,704 | A | 4/1994 | Evans et al. |
| 5,321,174 | A | 6/1994 | Evans et al. |
| 5,342,421 | A | 8/1994 | Breu |
| 5,359,061 | A | 10/1994 | Evans et al. |
| 5,360,553 | A | 11/1994 | Baskis |
| 5,386,070 | A * | 1/1995 | Evans .......... C10G 1/02 585/242 |
| 5,406,010 | A | 4/1995 | Ponsford et al. |
| 5,427,650 | A | 6/1995 | Holloway |
| 5,464,602 | A | 11/1995 | Evans et al. |
| 5,481,052 | A | 1/1996 | Hardman et al. |
| 5,608,136 | A * | 3/1997 | Maezawa .......... C10G 1/10 588/317 |
| 5,666,878 | A | 9/1997 | Taricco |
| 5,672,794 | A | 9/1997 | Northemann |
| 5,731,483 | A | 3/1998 | Stabel et al. |
| 5,744,668 | A | 4/1998 | Zhou et al. |
| 5,780,696 | A | 7/1998 | Bauer |
| 5,811,606 | A | 9/1998 | Yang |
| 5,820,736 | A | 10/1998 | Bouziane et al. |
| 5,821,396 | A | 10/1998 | Bouziane |
| 5,824,193 | A | 10/1998 | Edwards |
| 5,824,709 | A | 10/1998 | Suka |
| 5,836,524 | A | 11/1998 | Wang |
| 5,841,011 | A * | 11/1998 | Hashimoto .......... C10G 1/10 201/2.5 |
| 5,849,964 | A | 12/1998 | Holighaus et al. |
| 5,849,982 | A | 12/1998 | Lee et al. |
| 5,973,217 | A | 10/1999 | Hastrich et al. |
| 6,011,187 | A * | 1/2000 | Horizoe .......... B29B 17/02 201/2.5 |
| 6,046,370 | A | 4/2000 | Affolter et al. |
| 6,060,631 | A | 5/2000 | James, Jr. et al. |
| 6,150,577 | A | 11/2000 | Miller et al. |
| 6,172,271 | B1 | 1/2001 | Horizoe et al. |
| 6,172,275 | B1 | 1/2001 | Tadauchi et al. |
| 6,190,542 | B1 | 2/2001 | Comolli et al. |
| 6,288,296 | B1 | 9/2001 | Miller et al. |
| 6,534,689 | B1 * | 3/2003 | Stankevitch .......... C10G 1/10 585/241 |
| 6,861,568 | B1 | 3/2005 | Guffey et al. |
| 7,626,062 | B2 | 12/2009 | Carner |
| 7,758,729 | B1 | 7/2010 | DeWhitt |
| 7,892,500 | B2 | 2/2011 | Carner |
| 8,188,325 | B2 | 5/2012 | DeWhitt |
| 8,192,586 | B2 | 6/2012 | Garrison et al. |
| 8,192,587 | B2 | 6/2012 | Garrison et al. |
| 8,193,403 | B2 | 6/2012 | DeWhitt |
| 8,449,725 | B2 | 5/2013 | Yoon et al. |
| 8,674,154 | B2 * | 3/2014 | Podeszfa .......... C10B 47/18 201/8 |
| 9,725,655 | B2 * | 8/2017 | Gephart .......... C10G 1/02 |
| 10,301,235 | B1 * | 5/2019 | Cavinaw .......... C10G 1/02 |
| 10,421,911 | B2 | 9/2019 | Ullom |
| 10,717,936 | B2 * | 7/2020 | Stanislaus .......... C10G 1/086 |
| 10,731,080 | B1 * | 8/2020 | Cavinaw .......... C10B 7/06 |
| 2002/0070104 | A1 | 6/2002 | Nichols |
| 2002/0072640 | A1 | 6/2002 | Nichols et al. |
| 2002/0156332 | A1 | 10/2002 | Jiang |
| 2003/0047437 | A1 | 3/2003 | Stankevitch |
| 2003/0050519 | A1 * | 3/2003 | Cheng .......... C10B 47/06 201/2.5 |
| 2004/0050678 | A1 * | 3/2004 | Takahashi .......... C10G 1/10 202/108 |
| 2004/0222149 | A1 | 11/2004 | Abrams |
| 2005/0075521 | A1 | 4/2005 | Wada |
| 2005/0132883 | A1 | 6/2005 | Su et al. |
| 2007/0227874 | A1 | 10/2007 | Wolf-Eberhard et al. |
| 2009/0036720 | A1 | 2/2009 | Carner |
| 2009/0062581 | A1 | 3/2009 | Appel et al. |
| 2010/0305372 | A1 | 12/2010 | DeWhitt |
| 2010/0320070 | A1 * | 12/2010 | DeWhitt .......... C10B 47/18 201/20 |
| 2011/0067992 | A1 | 5/2011 | Yoon et al. |
| 2011/0239541 | A1 | 10/2011 | Garrison et al. |
| 2012/0024686 | A1 | 2/2012 | DeWhitt |
| 2012/0034571 | A1 | 2/2012 | Garrison et al. |
| 2012/0222986 | A1 | 9/2012 | Garrison et al. |
| 2013/0152455 | A1 | 6/2013 | Baird et al. |
| 2014/0114098 | A1 | 4/2014 | Hofer |
| 2015/0080624 | A1 | 3/2015 | Gephart et al. |
| 2016/0017232 | A1 | 1/2016 | Ullom |
| 2018/0371325 | A1 * | 12/2018 | Streiff .......... C10G 11/187 |
| 2021/0332299 | A1 * | 10/2021 | Timken .......... C10G 51/04 |

FOREIGN PATENT DOCUMENTS

| | | |
|---|---|---|
| EP | 0 934 995 A1 | 8/1999 |
| GB | 2 231 057 A | 11/1990 |
| JP | 10-88148 | 4/1998 |
| JP | 10-219260 A | 8/1998 |
| JP | 11-158473 A | 6/1999 |
| JP | 2001-247874 A | 9/2001 |
| JP | 2003-073500 A | 3/2003 |
| JP | 2004-269755 A | 9/2004 |
| JP | 2007-229660 A | 9/2007 |
| JP | 2009-091387 A | 4/2009 |
| JP | 2010-121091 A | 6/2010 |
| WO | 2011/123145 A1 | 10/2011 |
| WO | 2011/123272 A1 | 10/2011 |

\* cited by examiner

SYSTEMS AND METHODS FOR RECYCLING WASTE PLASTICS

TECHNICAL FIELD

The present disclosure relates generally to the recycling of waste plastics. Certain embodiments relate more specifically to systems and methods for pyrolyzing plastic feedstock to convert waste plastics into hydrocarbon based oil products.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
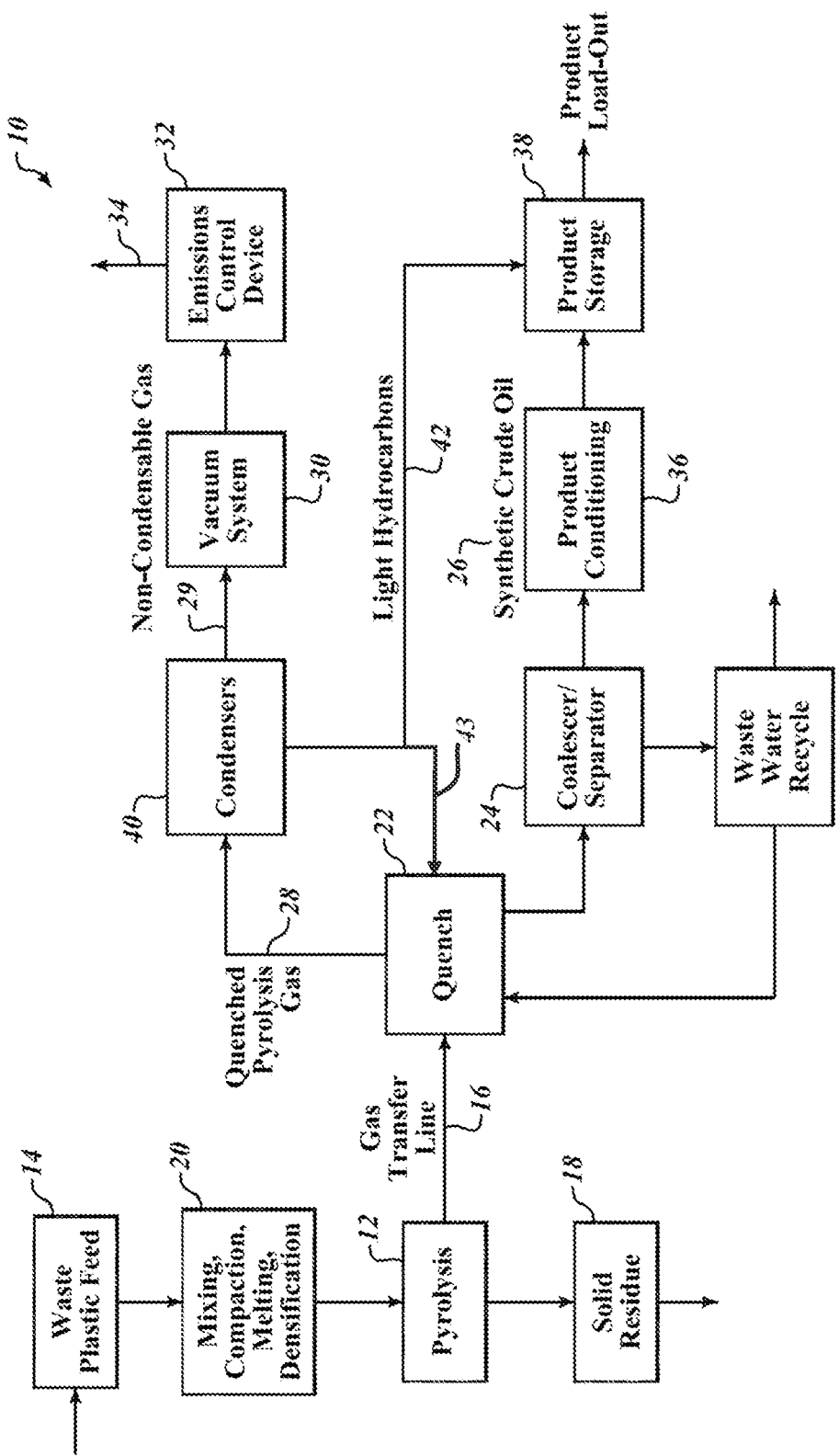
FIG. 1 provides a schematic diagram of an embodiment of a plastic recycling system.

Certain embodiments of systems and methods described herein are configured for efficient recycling of waste plastics. Some systems and methods can quickly and simply convert waste plastics into one or more purified organic molecular species, which can be considered a hydrocarbon oil product. The hydrocarbon oil product may be readily stored, transported, and/or refined into fuel or other commercially relevant materials.

In some embodiments, waste plastic feedstock can be fed continuously through the systems disclosed herein. The feedstock may be pre-melted via a mixing, heating and compacting apparatus prior to introduction into a pyrolysis reactor, which then heats the pre-melted feedstock such that the feedstock transitions into a vapor (e.g., one or more gases) for further processing. In some instances, the vapor can be introduced into a condenser and directly contacted with a pH adjusted solution (or other process solution), which can, in some instances, absorb a portion of the vapor and condense another portion thereof. The condensed material can comprise one or more organic molecular species that can be termed herein as a hydrocarbon oil product. The hydrocarbon oil product can be separated from the other portions of the vapor that are absorbed into the pH adjusted solution, and thus the hydrocarbon oil product can be of a clean or purified quality such that it may be readily refined from a crude state. In other instances, other condensing apparatuses or methodologies may be used to condense out desirable products from the vapor discharged from the pyrolysis reactor or reactors.

In some instances, the feedstock may comprise waste plastics including an appreciable amount of halide compounds or heteroatoms from one or more sources of contamination and the system may be configured to recover a hydrocarbon oil product therefrom. The system may include a mixing, heating and compacting apparatus configured to receive a supply of the waste plastic feedstock and to output a densified melt of plastic material. An amendment comprising or consisting of alkaline earth oxides and/or hydroxides, oxides of iron, and/or oxides of aluminum may be mixed, heated and compacted with the waste plastic based feedstock in the mixing, heating and compacting apparatus to form a densified melt of plastic material including the amendment. The system may further comprise a pyrolysis reactor configured to receive the densified melt of plastic material including the amendment, pyrolyze the densified melt of plastic material including the amendment, and output a hydrocarbon gas stream and a solids residue stream, the solid residue stream including a substantial portion of the halide compounds or heteroatoms of the waste plastic based feedstock via interaction of the halide compounds or heteroatoms with the amendment. Additionally, one or more condensers may be provided to condense out a hydrocarbon oil product from the hydrocarbon gas stream output from the pyrolysis reactor. In some instances, the system may be configured to condense out a tars product from the hydrocarbon gas stream output from the pyrolysis reactor with a quenching apparatus. The system may be further configured to route the tars product to a secondary pyrolysis reactor to generate a secondary hydrocarbon gas stream and a secondary solids residue stream. The secondary hydrocarbon gas stream may be further processed and combined with an altered hydrocarbon gas stream output from the quenching apparatus for subsequent processing by the one or more condensers to recover a hydrocarbon oil product.

Various illustrative embodiments of inventive systems and methods will now be described. Advantages of the systems and methods, as well as features and steps thereof, respectively, will be apparent from the disclosure that follows, including the Figures.

FIG. 1 provides a schematic diagram of an embodiment of a plastic recycling system 10. The plastic recycling system includes a heating system 12 that is configured to deliver heat to a plastic feedstock 14. The heating system 12 can comprise any suitable heating mechanism, such as, for example, a combustion burner, a fluidized bed burner, a retort, or any other such heating system. In some instances, the heating system comprises a pyrolysis recovery unit (PRU). The PRU may include a dual screw feed mechanism to receive the plastic feedstock and simultaneously transport and pyrolyze the feedstock, and to output a hydrocarbon gas stream 16 and a solids residue stream 18. The PRU may include multiple successive zones of heating along a length thereof.

The plastic feedstock 14 can comprise waste plastics of one or more varieties (e.g., mixed plastics), and may include trace amounts of non-plastic contamination or impurities. For example, the impurities may be of an external nature (e.g., water, foodstuffs, labeling, soil, paper, or cellulose waste) or may result from internal amendments of the waste plastics, such as fillers, plasticizers and other amendments, introduced at the time of manufacture of the waste plastics (e.g., glass, metal, iron, bromine, and/or chlorine). The plastic feedstock 14 may be provided in a ground, chipped, or other form that can promote the transfer of heat thereto.

The plastic feedstock 14 may be fed to the system in a continuous manner. A feed apparatus can include bins, hoppers, conveyors, mixers, heaters and compactors designed to provide a continuous material feed. The feed apparatus may comprise a mixing, heating and compacting apparatus 20 and may include a compactor and a pre-melter, such as a mixer designed to receive the feedstock and output a continuous stream of densified plastic melt. In other instances, the feedstock may be fed directly into the heating system (e.g., PRU) 12 without being subjected to pre-melting.

The heat provided by the heating system (e.g., pyrolysis recovery unit) 12 can be sufficient to crack or depolymerize the plastic feedstock 14 and convert at least a portion thereof into a vapor. The vapor can include one or more gaseous organic species, one or more gaseous inorganic species, and/or one or more varieties of entrained particles. In particular, the vapor can include depolymerized non-polar organic gases, which may be desirable for collection and refinement, and which can be mixed with impurities. The organic gases can include, for example, one or more paraffins, olefins, naphthenes, aromatics, and/or other classes of hydrocarbon materials. The mixed-in impurities can include, for example, inorganic acids (e.g., hydrochloric acid, hydrobromic acid), entrained metals or metalloids (e.g., cadmium, iron, antimony); and/or organic acids (e.g., terephthalic acid). In some embodiments, the vapor may include additional molecular species, such as polar organic molecules, which may or may not be collected with the non-polar organic molecules. For example, the vapor can include one or more alcohols, ketones, ethers, phenols, carboxylic acids, or other polar organic molecules.

In some embodiments, the plastic feedstock may be heated under vacuum conditions, or under negative pressure. In other embodiments, the plastic feedstock may be heated under positive pressure. In still other or further embodiments, the plastic feedstock may be heated under atmospheric pressure conditions, or under any suitable combination of the foregoing (e.g., the pressure may be varied during a heating event).

The vapor can be delivered to a vapor treatment system 22 that effects a phase change of at least a portion of the vapor such that certain molecules transition from a gaseous state to a liquid state. The vapor treatment system 22 may also be referred to as a vapor treatment unit or a vapor treatment vessel. The vapor treatment system 22 may include a pH adjusted solution (or other process solution) that is used to effect the condensation. Moreover, the pH adjusted solution can be configured to absorb at least a portion of the impurities from the vapor. Embodiments of the solution can readily absorb organic acids, inorganic acids, metals, metalloids, and/or certain polar organic molecules. The term "pH adjusted solution" is used in a broad sense and includes solutions that are not pH neutral and that exhibit any or all of the various properties described herein. For example, a pH adjusted solution can be formulated to remove impurities from the vapor, and in further embodiments, can be immiscible with condensed oils so as to be readily separated therefrom. For example, in some embodiments, the pH adjusted solution can comprise an acidic solution, which may, in some cases, be strongly acidic. In further embodiments, the pH adjusted solution can comprise a buffered aqueous solution adjusted to a desired pH value. In various embodiment, the pH adjusted solution can have a pH value that is less than 7, less than about 6.5, less than about 6, less than about 5.5, less than about 5, less than about 4, or less than about 3.

The pH adjusted solution can include one or more chemical amendments of any suitable variety to achieve the desired properties of the solution. Such properties can include, for example, the ability to remove one or more impurities from the vapor and/or a high immiscibility with oil. Adjustment or optimization of one or more of foregoing properties may be achieved by altering the concentration of the one or more chemical amendments within the pH adjusted solution. For example, the presence, combination, and/or concentration of one or more materials within the pH adjusted solution can optimize removal of contaminants from the vapor as it interacts with the pH adjusted solution. In various embodiments, the pH adjusted solution can include strong and/or weak inorganic acids (e.g., hydrochloric acid, acetic acid), one or more pH buffer solutions (e.g., acetic acid+sodium acetate), one or more chelating agents (e.g., ethylenediaminetetraacetic acid (EDTA)), and/or one or more coagulants and/or flocculants (e.g., calcium hydroxide, polyacrylamide).

The vapor treatment system 22 can be configured to effect direct contact between the vapor received therein and the pH adjusted solution (or other process solution). For example, as further discussed below, in some embodiments, the pH adjusted solution may be sprayed into contact with the vapor, whereas in other embodiments, the vapor may be bubbled through the solution. The pH adjusted solution can absorb or dissolve portions of the vapor (e.g., organic acids, inorganic acids, metals, metalloids, and/or certain polar organic molecules). The pH adjusted solution also can be provided at a lower temperature than that of the vapor such that the solution condenses at least those portions of the vapor that are immiscible therein (e.g., non-polar organic molecules).

Those portions of the condensed vapor that are immiscible in the pH adjusted solution (i.e., the hydrophobic portions) can be readily separated from the solution. In some embodiments, the separation (or at least one or more stages thereof) takes place within the vapor treatment system, whereas in other embodiments, the separation (or at least one or more stages thereof) takes place within a separator 24 that is independent of the vapor treatment system 22.

In some embodiments, the immiscible portions are removed from the vapor treatment system as a form of crude oil 26. The crude oil 26 thus can have few or no impurities, as the impurities that were present in the plastic feedstock are dissolved or absorbed into the pH adjusted solution. In some embodiments, at least some of the dissolved or absorbed impurities can remain within the pH adjusted solution within the vapor treatment system 22. For example, in some instances, after the pH adjusted solution has amassed the impurities, it may continue to be used within the vapor treatment system 22, such that the impurities are not removed (at least not immediately) from the vapor treatment system 22. In other or further embodiments, dissolved or absorbed impurities are removed from the vapor treatment system 22 separately from the oil 26.

Certain classes of polar organic molecules may only partially (or at least partially) partition into the pH adjusted solution. For example, a portion of certain alcohols, ketones, ethers, phenols, carboxylic acids, and/or other polar organic molecules may partition into the pH adjusted solution and another portion thereof may partition into the crude oil. Accordingly, in some embodiments, crude oil that includes a portion of a species of polar organic molecules may be separated from a pH adjusted solution that contains another portion of the species of polar organic molecules.

The vapor may include portions that do not condense within the vapor treatment system 22 and are not absorbed by the pH adjusted solution. Such non-condensable gases 29 can be removed separately from the vapor treatment system 22, and may be combusted or disposed of in any other suitable manner.

In various embodiments, the vapor treatment system 22 may operate under vacuum conditions, or under negative pressure. In other embodiments, the vapor treatment 22 system may operate under positive pressure. In still other or further embodiments, the vapor treatment system 22 may operate under atmospheric pressure conditions, or under any suitable combination of the foregoing (e.g., the pressure may be varied during a condensing event).

The system can be well suited for quickly cracking or depolymerizing the plastic feedstock. For example, in some embodiments, heating of the plastic feedstock and conversion thereof into the vapor can be performed at high temperatures at which a variety of different molecular species may be gasified simultaneously. Such different molecular species might have different vaporization temperatures at a given pressure, and a temperature at which the plastic feedstock is heated can exceed this temperature for some or all of the molecular species. The molecular species can then be separated from each other when the vapor is delivered to the vapor treatment system, as previously described. Accordingly, the system can operate without the heating system slowly heating up and occasionally holding steady at various discreet temperature levels along the way so as to allow for individual molecular species to be gasified sequentially. It is to be appreciated, however, the system may also be used in an operational mode in which the heating system and the plastic feedstock progress through a series of sequential heating steps or levels, as just described.

The system 10 can include a vacuum system 30 that is configured to maintain a negative pressure within the heating system (e.g., PRU) 12 and within the vapor treatment system 22. The vacuum system 30 can continuously evacuate gases from the heating system (e.g., PRU) 12 such that depolymerization of the plastic feedstock occurs in an oxygen-deprived or oxygen-free environment. The vacuum system 30 draws the vapor into the vapor treatment system 22, where it is contacted by the pH adjusted solution, or non-PH adjusted solution, or otherwise processed by a condensing apparatus or device. The vacuum system 30 draws the non-condensable gases 29 from the vapor treatment system 22, and may distribute them to a combustion unit or other suitable disposal device 32 (e.g., emissions control device). In some instances, the non-condensable gases 29 from the vapor treatment system 22 may be routed to a heat exchanger or other apparatus or system for energy recovering purposes. For instance, the non-condensable gases 29 from the vapor treatment system 22 may be routed to a heat exchanger to supply heat for other aspects of the systems and methods of processing waste plastics described herein, such as, for example, supplying heat to the mixing, heating and compacting apparatus 20 (e.g., pre-melt extruder) to assist in generating the densified plastic melt for introduction into the heating system (PRU) 12. In other instances, the non-condensable gases 29 from the vapor treatment system 22 may be routed to a heat exchanger or other energy recovery device to supply energy for other unrelated purposes.

The system 10 may include a coalescer/separator 24 that receives an emulsion of condensed material from the vapor treatment system 22. The emulsion can comprise crude oil that includes a small amount of the pH adjusted solution (or other process solution) entrained therein. The coalescer/separator 24 can be configured to separate the crude oil 26 from the pH adjusted solution (or other process solution) based on the difference in relative density between these materials. For example, the coalescer/separator 24 can comprise a settling tank that allows gravitational separation of the solution from the crude oil 26. In other embodiments, the coalescer/separator 24 may comprise a centrifuge or other separator device.

The system 10 can further include a variety of sensor and control components (not shown). For example, the system 10 can include one or more pressure sensors and/or temperature sensors, which can provide to a controller various data regarding the operation of the heating system (e.g., PRU) 12 and the amount of heat being delivered to the feedstock. The sensors can communicate with a controller in any suitable manner, such as by wired or wireless connection. The controller can alter operational parameters of the heating system (e.g., PRU) 12 in response to data received from the sensors and/or as a result of other programming.

A master control system may be configured to communicate with the controller, and may also be configured to communicate with additional controllers that may each be dedicated to subsystems of the plastic recycling system. For example, separate subsystem controllers may be dedicated to the vapor treatment system 22 and the vacuum system 30, respectively. In some embodiments, subsystem controllers may be situated locally (e.g., near the various subsystems with which they are associated), whereas the master control system may be situated in a supervisory station in which an operator can monitor the instantaneous status of the subsystems of the system 10 and make changes thereto as desired, whether onsite or offsite.

For the sake of convenience, subsystem controller(s) associated with a particular component may not be identified hereafter, nor will it be explicitly stated that a particular subsystem controller and/or the master control system is able to monitor and/or control the operation of a particular component of the plastic recycling system 10, although such is understood. It is also noted that steps or control events discussed herein which can be effected by sub-controllers and/or the master control system may be embodied in machine-executable instructions that are to be executed by a general-purpose or special-purpose computer (or other electronic device). Alternatively, the steps or control events may be performed or instigated by hardware components that include specific logic for performing the steps or control events, or by a combination of hardware, software, and/or firmware. Some or all of the steps may be performed locally (e.g., via a subsystem controller) or remotely.

As the feedstock is heated in the heating system (e.g., PRU) 12, the plastic feedstock eventually gasifies or vaporizes. The vapor can be introduced into the vapor treatment system 22 in any suitable manner. For example, in some embodiments, the vapor may be introduced into a condensing tower of a condenser substantially without altering a trajectory of the vapor. In other embodiments, the vapor may encounter a baffle upon entering the condensing tower.

Those portions of the vapor that are not condensed (i.e., non-condensable gases) may be passed to a caustic scrubber, which passes the remaining vapor through a caustic solution so as to chemically scrub the vapor (e.g., remove mercaptan sulfur species therefrom) and so as to neutralize trace levels of free inorganic acids. The remainder of the vapor may pass from the caustic scrubber through to an emissions control device (ECD) 32. Any suitable vacuum system 30 may be used with the plastic recycling system 10 to move the vapor accordingly.

Any suitable emissions control device (ECD) 32 can be used with the plastic recycling system 10. In some embodiments, the emissions control device 32 can comprise a burner or other combustion device. Exhaust 34 from the emissions control device 32 may be vented to atmosphere. In other embodiments, the hot exhaust 34 may instead be transferred to other portions of the plastic recycling system 10.

The absorbed and condensed portions of the vapor may settle into a tank of the coalescer/separator 24 that includes one or more weirs. The pH adjusted solution (or other process solution), which retains the absorbed impurities, may facilitate coagulation of some contaminants which have a greater relative density than the condensed crude oil material 26, and may settle to the bottom of the tank. Accordingly, the condensed crude oil 26 rises to the top of the tank and flows over the one or more weirs to be collected for further processing 36, storage 38 or use.

In addition, downstream processing may be provided in some embodiments to purify the product streams discussed herein or fractionate said streams into specified hydrocarbon cuts. Process units for this purpose may include, but are not limited to, distillation, solvent extraction, adsorption, and catalyst treatment units.

In some instances, one or more supplemental condensers 40 may be provided to condense out light hydrocarbons 42 from the quenched pyrolysis gas 28. The one or more streams of light hydrocarbons 42 may then be combined with the crude oil product 26, or may be stored as separate hydrocarbon products. In some instances, at least a portion 43 of the light hydrocarbons 42 may be directed to the vapor treatment system 22 to assist in quenching the pyrolysis gases, namely, the hydrocarbon gas stream 16 output from the heating system (e.g., PRU) 12. In some instances, at least a portion 43 of the light hydrocarbons 42 may be directed to the heating system (e.g., PRU) 12 to be reintroduced into the heating system (e.g., PRU) 12 for further processing.

Figure 2:
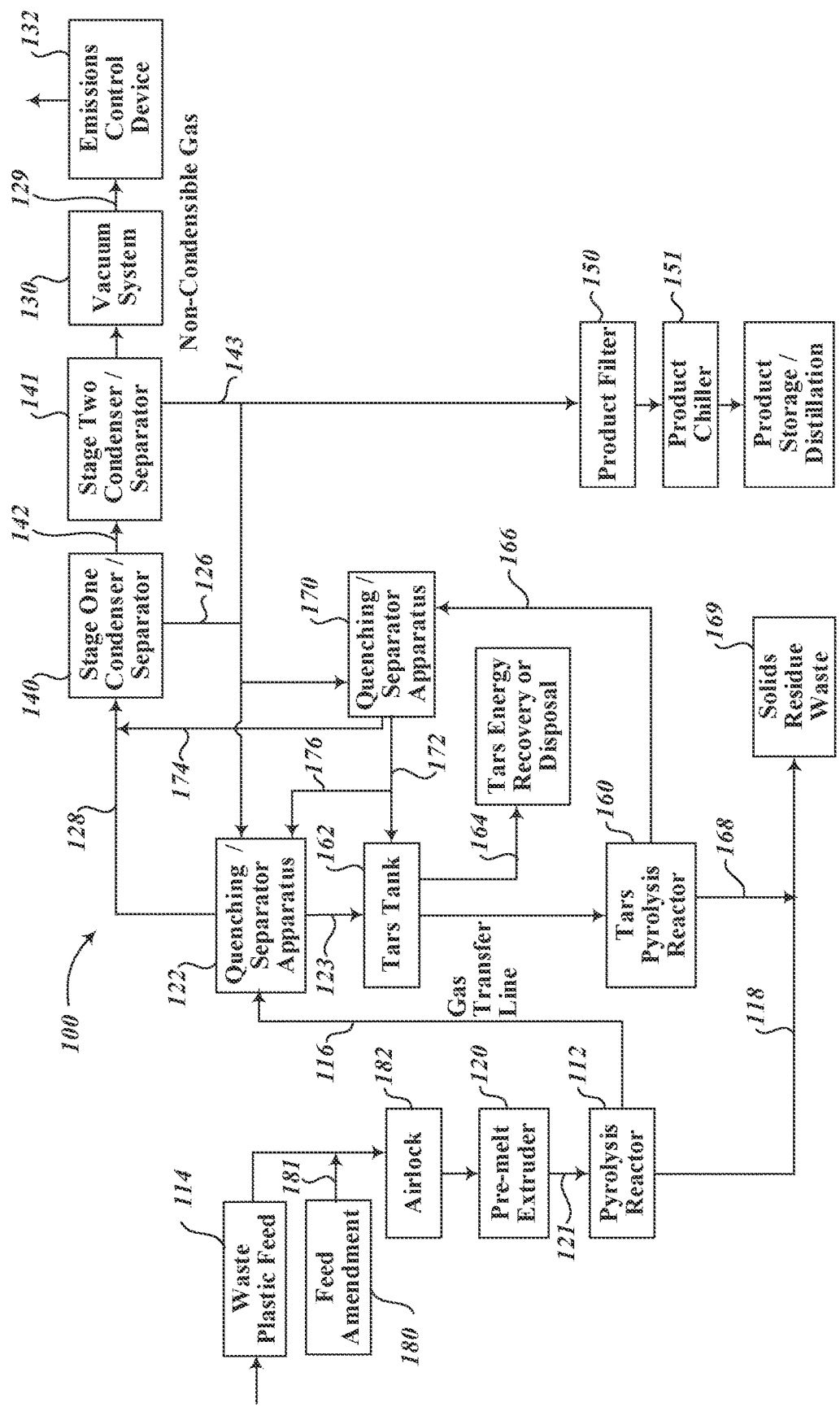
FIG. 2 provides a schematic diagram of another embodiment of a plastic recycling system.

FIG. 2 provides a schematic diagram of another embodiment of a plastic recycling system 100, which is particularly well suited for producing one or more hydrocarbon oil products 126, 143 from waste plastic feedstock 114. Similar to the aforementioned system, a mixing, heating and compacting apparatus (e.g., pre-melt extruder) 120 may be provided to receive a supply of waste plastic 114 and to output a densified melt of plastic material 121. The system 100 may further include a pyrolysis recovery unit (PRU) 112 that is configured to receive the densified melt of plastic material 121 and pyrolyze the densified melt of plastic material 121 and output a primary hydrocarbon gas stream 116 and a primary solids residue stream 118. The PRU 112 may comprise, for example, a dual screw feed mechanism within a reactor shell which is configured to simultaneously transport and heat the feedstock introduced into the PRU 112. The PRU 112 may have multiple zones of heating along a length thereof to effectively heat the feedstock to a pyrolysis temperature as the material progresses from one end of the PRU 112 to the other.

The system 100 may further comprise a primary quenching apparatus 122 that is configured to receive the hydrocarbon gas stream 116 output from the PRU 112 and to condense out a tars product 123 for introduction into a supplemental tars pyrolysis reactor 160 for further processing, as discussed elsewhere herein. Similar to the PRU 112, the supplemental tars pyrolysis reactor 160 may comprise a dual screw feed mechanism within a reactor shell which is configured to simultaneously transport and heat the material introduced into the supplemental tars pyrolysis reactor 160. The supplemental tars pyrolysis reactor 160 may have multiple zones of heating along a length thereof to effectively heat the feedstock to a pyrolysis temperature as the material progresses from one end of the supplemental tars pyrolysis reactor 160 to the other. The PRU 112 and the supplemental tars pyrolysis reactor 160 may have different form factors, throughput capacities and/or different heating profiles.

The primary quenching apparatus 122 may also be configured to discharge an altered hydrocarbon gas stream 128 for further processing. A primary condenser and separator 140 may be provided to receive the altered hydrocarbon gas stream 128 from the primary quenching apparatus 122 and to condense out and separate a hydrocarbon oil product 126. Additionally, a supplemental condenser and separator 141 may be provided to receive a discharged gas stream 142 from the primary condenser and separator 140 and to condense out and separate light hydrocarbons (e.g., methane, ethane, propane) to form a light hydrocarbon product 143 or to be combined with other product streams. The primary condenser and separator 140 and/or the supplemental condenser and separator 141 may be configured to direct a portion of the hydrocarbon oil product 126 and the light hydrocarbon product 143 upstream to the primary quenching apparatus 122 to assist in condensing out the tars product 123 from the hydrocarbon gas stream 116 output from the PRU 112. In some instances, at least a portion of the hydrocarbon oil product 126 and/or at least a portion of the light hydrocarbon product 143 may be directed to the heating system (e.g., PRU) 12 to be reintroduced into the heating system (e.g., PRU) 12 for further processing.

Any remaining non-condensable gasses 129 may be processed as described in connection with the aforementioned system, including processing by an appropriate emissions control device 132 and under the influence of a vacuum system 130. In some instances, the non-condensable gases 129 from the vapor treatment system 22 may be routed to a heat exchanger or other apparatus or system for energy recovering purposes. For instance, the non-condensable gases 129 from the vapor treatment system 22 may be routed to a heat exchanger to supply heat for other aspects of the systems and methods of processing waste plastics described herein, such as, for example, supplying heat to the mixing, heating and compacting apparatus 20 (e.g., pre-melt extruder) to assist in generating the densified plastic melt for introduction into the heating system (PRU) 12. In other instances, the non-condensable gases 129 from the vapor treatment system 22 may be routed to a heat exchanger or other energy recovery device to supply energy for other unrelated purposes.

Although multiple stage condenser/separators are shown and described herein, it is appreciated that the systems and methods described herein are not limited to the use of multiple stage condensing and separating, and may, in other instances, include a single stage condensing and separating apparatus or employ other well know systems and techniques for condensing and separating out one or more desired products, such as through distillation techniques and the like.

The hydrocarbon oil product stream may be filtered and chilled by a product filter 150 and a product chiller 151 prior to product storage or transport. In addition, downstream processing may be provided in some embodiments to purify the product streams discussed herein or fractionate said streams into specified hydrocarbon cuts. Process units for this purpose may include, but are not limited to, distillation, solvent extraction, adsorption, and catalyst treatment units.

As discussed above, the system 100 may comprise a primary quenching apparatus 122 that is configured to receive the hydrocarbon gas stream 116 output from the PRU 112 and to condense out a tars product 123 for routing to a tars pyrolysis reactor 160 for further processing. A supply of the tars product 123 may be temporarily stored in a tars tank 162 for subsequent processing or use. A portion of the tars product 123 may be bled off from the system 100 and routed via a tars bleed line 164 to an energy recovery unit or to an appropriate disposal system. At least some of the tars product 123 may be routed to the tars pyrolysis reactor 160 for pyrolysis of the tars product 123 into a secondary hydrocarbon gas stream 166 and a secondary solids residue stream 168. The secondary solids residue stream 168 may be combined with the primary solids residue stream 118 and routed to an appropriate waste disposal system 169.

Advantageously, the system 100 may further comprise a secondary quenching apparatus 170 that is configured to receive the secondary hydrocarbon gas stream 166 output from the tars pyrolysis reactor 160 and to condense out a supplemental hydrocarbon product 172. The supplemental hydrocarbon product 172 may be combined with the tars product 123 output from the primary quenching apparatus 122 for reentry into the tars pyrolysis reaction 160 for further processing as discussed above. In this manner, a portion of the feedstock can be continuously refined by the tars pyrolysis reactor 160 to provide an exceptionally purified hydrocarbon based oil product.

The secondary quenching apparatus 170 may also be configured to discharge a supplemental altered hydrocarbon gas stream 174. The supplemental altered hydrocarbon gas stream 174 may be combined with the altered hydrocarbon gas stream 128 from the primary quenching apparatus 122 and routed to the primary and secondary condenser and separators 140, 141 for further processing as discussed above. In addition, the secondary quenching apparatus 170 may be configured to receive a portion of the hydrocarbon oil product 126 and/or the light hydrocarbon product 143 from the condenser and separators 140, 141 to assist in condensing out the supplemental hydrocarbon product 172 from the secondary hydrocarbon gas stream 166 output from the tars pyrolysis reactor 160.

In accordance with some aspects of the present invention, a supply of the waste plastic feedstock may include an appreciable amount of halide compounds (e.g., hydrogen chloride) or heteroatoms (e.g., sulfur, phosphorous) from one or more sources of contamination (e.g., halide containing plastics such as PVC, polymer additives, contaminants from food, soil, salt and other environmental sources). Advantageously, embodiments of the systems described herein may include an amendment feed arrangement 180 to enable the introduction of an amendment 181 to the feedstock to be pyrolyzed with the waste plastic material 114 and any contaminants therein. The amendment 181 may comprise, for example, alkaline earth oxides and/or hydroxides, oxides of iron, and/or oxides of aluminum. In particular, the amendment 181 may comprise, for example, at least one of: calcium oxide (CaO); calcium hydroxide ($Ca(OH)_2$); ferric oxide ($Fe_2O_3$); and alumina ($Al_2O_3$). The amendment 181 may be provided in the form of: a homogenous powder or particles; supported material on a solid substrate; or a slurry. For example, the amendment 181 may be provided in the form of a slurry having a solvent in the form of water, a hydrocarbon, or a hydrocarbon mixture. The amendment 181 may be provided in a concentration of between 1% and 10% by weight of the combined waste plastic feedstock and amendment, or between 3% and 4% by weight of the combined waste plastic feedstock and amendment, or about 3.5% by weight of the combined waste plastic feedstock and amendment.

Advantageously, the amendment 181 may be combined with the waste plastic based feedstock prior to mixing, heating and compacting of the supply of the waste plastic based feedstock 114 to form the densified melt of plastic material 121. For example, the supply of the waste plastic based feedstock 114 and the amendment 181 may be mixed, compacted and heated to at least about 200 degrees Celsius prior to introduction in the pyrolysis reactor 112 to provide a particularly advantageous densified melt of plastic material having the amendment interspersed therein. In addition, the waste plastic based feedstock 114 and the amendment 181 may be fed through an airlock 182 to substantially reduce or eliminate oxygen from the waste plastic based feedstock 114 and the amendment 181. In this manner, the densified melt of plastic material 121 may comprise the amendment intermixed throughout the densified melt of plastic material 121 prior to supplying of the densified melt of plastic material 121 to the pyrolysis reactor 112 under oxygen free or low oxygen conditions. Although the airlock 182 is illustrated schematically as a separate component or sub-system, the airlock 182 may be integrated into the mixing, heating and compacting apparatus (e.g., pre-melt extruder) 120, when provided, or into the pyrolysis reactor 112 to provide oxygen free or low oxygen conditions within the pyrolysis reactor 112 during pyrolysis.

The amendment 181 may be mixed with the waste plastic based feedstock 114 prior to introduction into the mixing, heating and compacting apparatus (e.g., pre-melt extruder) 120, or may be mixed with the waste plastic based feedstock within the mixing, heating and compacting apparatus (e.g., pre-melt extruder) 120 itself. In other less advantageous instances, the amendment 181 may be fed into the pyrolysis reactor 112 separate from the densified melt of plastic material 121 to be mixed with the plastic material within the pyrolysis reactor 112 itself. Still further, in embodiments where the mixing, heating and compacting apparatus (e.g., pre-melt extruder) 120 may be omitted, the amendment 181 may be combined with the waste plastic based feedstock 114 and may forgo pre-melting prior to introduction of the materials into the pyrolysis reactor 112.

In any event, upon pyrolysis of the waste plastic feedstock 114 intermixed with the amendment 181, the pyrolysis reactor 112 is configured to output the hydrocarbon gas stream 116 for processing (as discussed above) and the solids residue stream 118. Advantageously, in such instances, the solid residue stream 118 includes a substantial portion of the halide compounds or heteroatoms of the waste plastic based feedstock 114 via interaction of the halide compounds or heteroatoms with the amendment 181. As such, the addition of the amendment 181 can assist to provide an exceptionally purified hydrocarbon based oil product by effectively removing halide compounds and heteroatoms from the product streams.

In view of the foregoing, it will be appreciated that various methods of processing waste plastics may be provided.

According to one example embodiment, a method of processing waste plastics may be summarized as including: mixing, heating and compacting a supply of a waste plastic based feedstock including an appreciable amount of halide compounds or heteroatoms from one or more sources of contamination; providing an amendment comprising alkaline earth oxides and/or hydroxides, oxides of iron, and/or oxides of aluminum to be mixed, heated and compacted with the waste plastic based feedstock to form a densified melt of plastic material including the amendment; supplying the densified melt of plastic material including the amendment to a pyrolysis reactor; pyrolyzing the densified melt of plastic material including the amendment within the pyrolysis reactor to generate a hydrocarbon gas stream and a solids residue stream, the solid residue stream including a substantial portion of the halide compounds or heteroatoms of the waste plastic based feedstock via interaction of the halide compounds or heteroatoms with the amendment; and condensing out the hydrocarbon based product from the hydrocarbon gas stream output from the pyrolysis reactor.

Providing the amendment may include mixing the amendment with the waste plastic based feedstock prior to or during the mixing, heating and compacting of the supply of the waste plastic based feedstock to form the densified melt of plastic material, such that the densified melt of plastic material comprises the amendment intermixed throughout the densified melt of plastic material prior to supplying of the densified melt of plastic material including the amendment to the pyrolysis reactor.

The method may further include, prior to mixing, heating and compacting the supply of the waste plastic based feedstock and the amendment, passing the supply of the waste plastic based feedstock and the amendment through an airlock to substantially reduce or eliminate oxygen from the waste plastic based feedstock and the amendment.

The method may further include condensing out a tars product from the hydrocarbon gas stream output from the pyrolysis reactor with a quenching apparatus and routing the tars product to a secondary pyrolysis reactor distinct from the pyrolysis reactor to generate a secondary hydrocarbon gas stream and a secondary solids residue stream. The method may further include condensing out a hydrocarbon product from the secondary hydrocarbon gas stream output from the secondary pyrolysis reactor with a secondary quenching apparatus and routing the hydrocarbon product to the secondary pyrolysis reactor for further processing. Still further, the method may include: discharging an altered hydrocarbon gas stream from the quenching apparatus; discharging a supplemental altered hydrocarbon gas stream from the secondary quenching apparatus; and combining the altered hydrocarbon gas stream from the quenching apparatus and the supplemental altered hydrocarbon gas stream from the secondary quenching apparatus for further processing by one or more condensers.

Another example embodiment of a method of processing waste plastics may be summarized as including: pyrolyzing a supply of a waste plastic feedstock within a primary pyrolysis reactor to generate a primary hydrocarbon gas stream and a primary solids residue stream; condensing out a tars product from the primary hydrocarbon gas stream output from the primary pyrolysis reactor with a primary quenching apparatus; discharging a primary altered hydrocarbon gas stream from the primary quenching apparatus; pyrolyzing the tars product within a secondary pyrolysis reactor to generate a secondary hydrocarbon gas stream and a secondary solids residue stream; condensing out a supplemental hydrocarbon product from the secondary hydrocarbon gas stream output from the secondary pyrolysis reactor with a secondary quenching apparatus; discharging a supplemental altered hydrocarbon gas stream from the secondary quenching apparatus; combining the supplemental altered hydrocarbon gas stream from the secondary quenching apparatus with the primary altered hydrocarbon gas stream from the primary quenching apparatus to form a combined altered hydrocarbon gas stream; and condensing out a hydrocarbon oil product from the combined altered hydrocarbon gas stream with one or more condensers. The method may further include routing the supplemental hydrocarbon product from the secondary quenching apparatus to the secondary pyrolysis reactor for further processing.

Furthermore, the method may include: mixing, heating and compacting the supply of the waste plastic feedstock to form a densified melt of plastic material; and supplying the densified melt of plastic material to the primary pyrolysis reactor. In some instances, the method may further include providing an amendment comprising alkaline earth oxides and/or hydroxides, oxides of iron, and/or oxides of aluminum to be mixed, heated and compacted with the waste plastic based feedstock for introduction into the pyrolysis reactor. In yet other instances, the method may further include providing an amendment comprising alkaline earth oxides and/or hydroxides, oxides of iron, and/or oxides of aluminum to be combined with the waste plastic feedstock for pyrolysis treatment within the primary pyrolysis reactor without pre-melting.

It is appreciated that aspects of the systems and methods described herein may be applicable to treating mixed waste plastics comprising a variety of plastics types, or treating a mixed waste plastic feedstock that may be characterized by including predominantly one or more particular waste plastics, such as, for example, a feedstock of predominately waste polystyrene from which a monomer (i.e., styrene) product may be recovered.

It is also appreciated that aspects of the systems and methods described herein may include the aforementioned mixing, heating and compacting apparatus (e.g., pre-melt extruder) 20, 120 to receive a supply of waste plastic and to output a densified melt of plastic material, or, in other instances, the feedstock may be fed directly into the heating system or pyrolysis reactor (e.g., PRU) 12, 112 without being subjected to pre-melting.

Still further, it is appreciated that various product streams generated throughout the systems and methods described herein, may be routed back to the heating system or pyrolysis reactor (PRU) 12, 112 to be reintroduced into the heating system or pyrolysis reactor (PRU) 12, 112 for further processing, or may by routed elsewhere or sold as a separate product with or without additional conditioning of said product streams.

Additional components, features and functionality of the systems will be readily apparent to those of ordinary skill in the relevant art upon a review of the detailed schematic diagrams provided in the Figures.

Moreover, it will be understood by those having ordinary skill in the relevant art that changes may be made to the details of the embodiments described and illustrated herein without departing from the underlying principles presented herein. For example, any suitable combination of various embodiments, or the features thereof, is contemplated. For example, various embodiments may be configured to operate in one or more of a batch mode, a continuous batch mode, or a continuous mode. Other or further embodiments may include a condenser system and/or other components that are configured to operate under one or more of vacuum conditions, atmospheric pressure conditions, or positive pressure conditions.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

U.S. Provisional Patent Application No. 63/123,965, filed Dec. 10, 2020, is incorporated herein by reference, in its entirety.

The invention claimed is:

1. A method of processing a waste plastic based feedstock to form a hydrocarbon based product, the method comprising:
   mixing, heating and compacting a supply of the waste plastic based feedstock, the waste plastic based feedstock including halide compounds or heteroatoms from one or more sources of contamination;
   providing at least one amendment selected from the group consisting of alkaline earth oxides, alkaline earth hydroxides, oxides of iron, and oxides of aluminum to be mixed, heated and compacted with the waste plastic based feedstock to form a densified melt of plastic material including the amendment;
   prior to mixing, heating and compacting the supply of the waste plastic based feedstock and the amendment, passing the supply of the waste plastic based feedstock and the amendment through an airlock to substantially reduce or eliminate oxygen from the waste plastic based feedstock and the amendment;
   supplying the densified melt of plastic material including the amendment to a pyrolysis reactor;
   pyrolyzing the densified melt of plastic material including the amendment within the pyrolysis reactor to generate a hydrocarbon gas stream and a solids residue stream, the solid residue stream including a substantial portion of the halide compounds or heteroatoms of the waste plastic based feedstock via interaction of the halide compounds or heteroatoms with the amendment; and
   condensing out the hydrocarbon based product from the hydrocarbon gas stream output from the pyrolysis reactor.

2. The method of claim 1 wherein the amendment is selected from the group consisting of calcium oxide (CaO); calcium hydroxide ($Ca(OH)_2$); ferric oxide ($Fe_2O_3$); and alumina ($Al_2O_3$).

3. The method of claim 1 wherein providing the amendment includes mixing the amendment with the waste plastic based feedstock prior to the mixing, heating and compacting of the supply of the waste plastic based feedstock to form the densified melt of plastic material including the feed amendment, and wherein the densified melt of plastic material comprises the amendment intermixed throughout the densified melt of plastic material prior to supplying of the densified melt of plastic material including the amendment to the pyrolysis reactor.

4. The method of claim 1 wherein providing the amendment includes mixing the amendment with the waste plastic based feedstock during the mixing, heating and compacting of the supply of the waste plastic based feedstock to form the densified melt of plastic material including the feed amendment, and wherein the densified melt of plastic material comprises the amendment intermixed throughout the densified melt of plastic material prior to supplying of the densified melt of plastic material including the feed amendment to the pyrolysis reactor.

5. The method of claim 1 wherein the amendment is a homogenous powder or particles; supported material on a solid substrate; or a slurry.

6. The method of claim 5 wherein the amendment is added to water, a hydrocarbon, or a hydrocarbon mixture forming a slurry.

7. The method of claim 1 wherein providing the amendment includes providing the amendment in a concentration of between 1% and 10% by weight of the combined waste plastic feedstock and amendment.

8. The method of claim 7 wherein providing the amendment includes providing the amendment in a concentration of between 3% and 4% by weight of the combined waste plastic feedstock and amendment.

9. The method of claim 1 wherein mixing, heating and compacting a supply of the waste plastic based feedstock and the amendment includes heating the supply of the waste plastic based feedstock and the amendment to at least about 200 degrees Celsius prior to introduction in the pyrolysis reactor.

10. The method of claim 1 wherein the pyrolysis reactor is a primary pyrolysis reactor, and wherein the method further comprises:
    condensing out a tars product from the hydrocarbon gas stream output from the primary pyrolysis reactor with a primary quenching apparatus and routing the tars product to a secondary pyrolysis reactor distinct from the primary pyrolysis reactor to generate a secondary hydrocarbon gas stream and a secondary solids residue stream.

11. The method of claim 10, further comprising:
    condensing out a hydrocarbon product from the secondary hydrocarbon gas stream output from the secondary pyrolysis reactor with a secondary quenching apparatus and routing the hydrocarbon product to the secondary pyrolysis reactor for further processing.

12. The method of claim 10, further comprising:
    discharging an altered hydrocarbon gas stream from the primary quenching apparatus;
    discharging a supplemental altered hydrocarbon gas stream from the secondary quenching apparatus; and
    combining the altered hydrocarbon gas stream from the primary quenching apparatus and the supplemental altered hydrocarbon gas stream from the secondary quenching apparatus for further processing by one or more condensers.

13. A system for processing a waste plastic based feedstock, the system comprising:
    a mixing, heating and compacting apparatus configured to receive a supply of the waste plastic feedstock and to output a densified melt of plastic material, the waste plastic based feedstock including halide compounds or heteroatoms from one or more sources of contamination;
    an amendment feed arrangement for providing at least one amendment selected from the group consisting of alkaline earth oxides, alkaline earth hydroxides, oxides of iron, and oxides of aluminum to be mixed, heated and compacted with the waste plastic based feedstock in the mixing, heating and compacting apparatus to form a densified melt of plastic material including the amendment;
    a pyrolysis reactor configured to receive the densified melt of plastic material including the amendment, pyrolyze the densified melt of plastic material including the amendment, and output a hydrocarbon gas stream and a solids residue stream, the solid residue stream including a substantial portion of the halide compounds or heteroatoms of the waste plastic based feedstock via interaction of the halide compounds or heteroatoms with the amendment;

an airlock located upstream of the mixing, heating and compacting apparatus to substantially reduce or eliminate oxygen from the waste plastic based feedstock and the amendment; and at least one condenser configured to condense out a hydrocarbon based oil product from the hydrocarbon gas stream output from the pyrolysis reactor.

14. The system of claim 13, further comprising:
a primary quenching apparatus configured to receive the hydrocarbon gas stream output from the pyrolysis reactor and condense out a tars product, and to discharge a primary altered hydrocarbon gas stream;

a secondary pyrolysis reactor configured to receive the tars product, pyrolyze the tars product, and output a secondary hydrocarbon gas stream and a secondary solids residue stream; and a secondary quenching apparatus configured to receive the secondary hydrocarbon gas stream output from the secondary pyrolysis reactor and condense out a supplemental hydrocarbon product, and to discharge a supplemental altered hydrocarbon gas stream, and wherein the at least one condenser is configured to receive the primary altered hydrocarbon gas stream and the supplemental altered hydrocarbon gas stream from the primary and secondary quenching apparatuses and condense out the hydrocarbon based oil product.

15. The system of claim 14 wherein a recycling line is arranged to route the supplemental hydrocarbon product from the secondary quenching apparatus to the secondary pyrolysis reactor for further processing.

16. A method of processing a waste plastic feedstock, the method comprising:
pyrolyzing a supply of the waste plastic feedstock within a primary pyrolysis reactor to generate a primary hydrocarbon gas stream and a primary solids residue stream;

condensing out a tars product from the primary hydrocarbon gas stream output from the primary pyrolysis reactor with a primary quenching apparatus;

discharging a primary altered hydrocarbon gas stream from the primary quenching apparatus;

pyrolyzing the tars product within a secondary pyrolysis reactor to generate a secondary hydrocarbon gas stream and a secondary solids residue stream;

condensing out a supplemental hydrocarbon product from the secondary hydrocarbon gas stream output from the secondary pyrolysis reactor with a secondary quenching apparatus;

discharging a supplemental altered hydrocarbon gas stream from the secondary quenching apparatus;

combining the supplemental altered hydrocarbon gas stream from the secondary quenching apparatus with the primary altered hydrocarbon gas stream from the primary quenching apparatus to form a combined altered hydrocarbon gas stream; and condensing out a hydrocarbon oil product from the combined altered hydrocarbon gas stream with one or more condensers.

17. The method of claim 16, further comprising:
routing the supplemental hydrocarbon product from the secondary quenching apparatus to the secondary pyrolysis reactor for further processing.

18. The method of claim 16, further comprising:
mixing, heating and compacting the supply of the waste plastic feedstock to form a densified melt of plastic material; and supplying the densified melt of plastic material to the primary pyrolysis reactor.

19. The method of claim 18 wherein the supply of the waste plastic feedstock includes halide compounds or heteroatoms from one or more sources of contamination, and wherein the method further comprises:
providing at least one amendment selected from the group consisting of alkaline earth oxides, alkaline earth hydroxides, oxides of iron, and oxides of aluminum to be mixed, heated and compacted with the waste plastic based feedstock for introduction into the primary pyrolysis reactor.

20. The method of claim 19 wherein, during the pyrolyzing, the amendment in the waste plastic feedstock chemically interacts with the halide compounds or heteroatoms of the waste plastic based feedstock to remove at least a substantial portion of the halide compounds or heteroatoms from the primary hydrocarbon gas stream.

21. The method of claim 16, wherein the supply of the waste plastic feedstock includes halide compounds or heteroatoms from one or more sources of contamination, and wherein the method further comprises:
providing at least one amendment selected from the group consisting of alkaline earth oxides, alkaline earth hydroxides, oxides of iron, and oxides of aluminum to be combined with the waste plastic feedstock for pyrolysis treatment within the primary pyrolysis reactor.

22. A system for processing a waste plastic feedstock, the system comprising:
a primary pyrolysis reactor configured to receive a supply of the waste plastic feedstock, pyrolyze the waste plastic feedstock, and output a primary hydrocarbon gas stream and a primary solids residue stream;

a primary quenching apparatus configured to receive the primary hydrocarbon gas stream output from the primary pyrolysis reactor and condense out a tars product, and to discharge a primary altered hydrocarbon gas stream;

a secondary pyrolysis reactor configured to receive the tars product, pyrolyze the tars product, and output a secondary hydrocarbon gas stream and a secondary solids residue stream;

a secondary quenching apparatus configured to receive the secondary hydrocarbon gas stream output from the secondary pyrolysis reactor and condense out a supplemental hydrocarbon product, and to discharge a supplemental altered hydrocarbon gas stream; and at least one condenser configured to receive the primary altered hydrocarbon gas stream and the supplemental altered hydrocarbon gas stream from the primary and secondary quenching apparatuses and condense out a hydrocarbon oil product.

23. The system of claim 22 wherein a recycling line is arranged to route the supplemental hydrocarbon product from the secondary quenching apparatus to the secondary pyrolysis reactor for further processing.

24. The system of claim 22, further comprising:
a mixing, heating and compacting apparatus configured to receive the supply of the waste plastic feedstock prior to the primary pyrolysis reactor and to output a densified melt of plastic material for supply to the primary pyrolysis reactor.

25. The system of claim 24 wherein the supply of the waste plastic feedstock includes halide compounds or heteroatoms from one or more sources of contamination, and wherein the system further comprises:

an amendment feed device for providing at least one amendment selected from the group consisting of alkaline earth oxides, alkaline earth hydroxides, oxides of iron, and oxides of aluminum to be mixed, heated and compacted with the waste plastic based feedstock in the mixing, heating and compacting apparatus for subsequent introduction into the primary pyrolysis reactor.

26. The system of claim 25 wherein, during the pyrolysis within the primary pyrolysis reactor, the amendment in the waste plastic feedstock chemically interacts with the halide compounds or heteroatoms of the waste plastic based feedstock to remove at least a substantial portion of the halide compounds or heteroatoms from the primary hydrocarbon gas stream.

27. The system of claim 22, wherein the supply of the waste plastic feedstock includes halide compounds or heteroatoms from one or more sources of contamination, and wherein the method further comprises:

an amendment feed arrangement for providing at least one amendment selected from the group consisting of alkaline earth oxides, alkaline earth hydroxides, oxides of iron, and oxides of aluminum to be combined with the waste plastic feedstock for pyrolysis treatment within the primary pyrolysis reactor.

\* \* \* \* \*